United States Patent
Seiler (10) Patent No.: US 6,690,996 B2
(45) Date of Patent: Feb. 10, 2004

(54) METHOD AND DEVICE FOR THE SEQUENTIAL SUPPLY OF ARTICLES TO BE PROCESSED

(75) Inventor: Rico Seiler, Jona SG (CH)

(73) Assignee: Ferag AG, Hinwil (CH)

( * ) Notice: Subject to any disclaimer, the term of this patent is extended or adjusted under 35 U.S.C. 154(b) by 0 days.

(21) Appl. No.: 10/271,060

(22) Filed: Oct. 15, 2002

(65) Prior Publication Data

US 2003/0083775 A1 May 1, 2003

(30) Foreign Application Priority Data

Oct. 15, 2001 (CH) .............................................. 1895/01

(51) Int. Cl.$^7$ ................................................ G06F 7/00
(52) U.S. Cl. ....................... 700/228; 700/220; 700/223; 198/357; 198/580; 270/52.04; 271/205
(58) Field of Search ................................ 700/213, 219, 700/220, 223, 228, 229, 230; 198/357, 580; 270/1.3, 52.04, 52.05, 52.15, 58.01, 58.03, 58.02; 271/204, 205, 82

(56) References Cited

U.S. PATENT DOCUMENTS

| | | | | |
|---|---|---|---|---|
| 4,401,207 A | * | 8/1983 | Garvey ...................... | 198/580 |
| 5,025,610 A | * | 6/1991 | Graushar ..................... | 53/411 |
| 5,280,895 A | | 1/1994 | Meier | |
| 5,414,974 A | * | 5/1995 | Van de Ven et al. ......... | 53/399 |
| 5,660,382 A | * | 8/1997 | Meier ....................... | 270/52.16 |
| 6,304,795 B1 | | 10/2001 | Reist | |
| 6,446,953 B1 | * | 9/2002 | Felix et al. ............... | 270/52.19 |
| 6,513,641 B1 | * | 2/2003 | Affaticati et al. .......... | 198/357 |

FOREIGN PATENT DOCUMENTS

EP   0 511 159 A   10/1992

OTHER PUBLICATIONS

WO 98/03347, Operation for Processing Piece Goods as Well as Control Process and Facility for Carrying out the Processing Operation Publication Date Jan. 29, 1998.

* cited by examiner

Primary Examiner—Khoi H. Tran
(74) Attorney, Agent, or Firm—Rankin, Hill, Porter & Clark LLP (57) ABSTRACT

For allowing a reduction in the processing capacity to be accommodated without a delay in a system, in which articles are supplied and transferred to an article processing device (8) from an article delivering device (4) in a regularly clock-cycled supply stream, articles are not transferred to the article processing device when there is no processing capacity. Instead, they are conveyed onwards along a return track (9) and are re-introduced into the supply stream at a return point (6) upstream of the transfer point (7). For each re-introduction of a returned article into the supply stream, a gap is produced in the supply stream in a gap formation point (5) upstream of the return point (6). For synchronizing returned articles and gaps, the length (in clock cycles) of the return track (9) is matched to the length (in clock cycles) of the supply track (3) from the gap formation point (5) to the return point (6) and to a time difference (in clock cycles) between a non-transfer and formation of a corresponding gap. The system is suitable for supplying main products from a web-fed printing press to a stacking/packaging device where normal packages and peak packages are produced. The main products are completed prior to be stacked and packed. In this application it is possible to operate the article supply regularly clock-cycled although no separate processing device for producing the peak packages is provided and although no completed products are to be removed from the system.

16 Claims, 5 Drawing Sheets

METHOD AND DEVICE FOR THE SEQUENTIAL SUPPLY OF ARTICLES TO BE PROCESSED

BACKGROUND OF THE INVENTION

1. Field of the Invention

The invention is related to the field of piece goods processing and concerns a method and a device for the sequential supply of a large number of articles to a processing operation, i.e. for conveying the articles to a processing device and for transferring the articles for being processed.

2. Description or Related Art

Sequential supply of articles to a processing operation is simple both with respect to the device as well as with respect to control, providing that processing can be operated regularly clocked throughout. Supply and processing are in such a case advantageously fixedly coupled through a common drive or through a common control system such that variations in the processing capacity (number of articles processed per unit of time) are taken up by the supply system without delay. Fixedly coupled systems of this kind can only be used if the articles to be supplied to processing are retrieved from a reservoir (e.g., off-line supply from storage formations) and if retrieval from the reservoir can be adapted to fluctuations in the processing performance without delay.

For on-line supply, i.e., for supplying articles which are, for example, delivered directly from a manufacturing device, systems with fixedly coupled supply and processing are not advantageous if performance variations of the processing operation are to be expected and if it is not possible, or possible only with a temporal delay, to adapt the delivering capacity to a momentary processing capacity.

For avoiding the disadvantages of systems in which, as briefly described above, supply and processing are coupled by a system clocking, the supply means may comprise a switch-point for removing supplied articles from the system, when there is no processing capacity available for them. For enabling the system to react to unforeseen reductions of the processing capacity, the articles are removed from the system immediately before being processed. Supply systems comprising article removal means can be operated in a regularly clocked manner even if the processing capacity is not constant and therefore, they can be implemented in a relatively simple manner even for held conveyance, e.g. using circulating gripper chains having regularly spaced grippers and being driven with a substantially constant speed. If, however, the processing capacity lies below the supply capacity to a considerable degree or for a longer time period, then a large number of removed articles accumulate. These articles either have to be rejected or else are to be resupplied into the system at a suitable point and at a suitable time, usually by manual labor.

Removal of supplied articles from the system for compensating a reduction in processing capacity is prevented according to prior art. For example, the prior art teaches installing a further processing device for processing articles that cannot be processed by the first processing device. This further device, however, represents a great additional expense and the utilization factor of this device in many instances is very low.

More elegant, however, with respect to the devices even more elaborate, are solutions to the same problem in which the supply is not operated in a strictly clocked manner, but comprises a buffer stretch de-coupling the article delivery (e.g., on-line from production or off-line from a store) and the article transfer to the rig processing operation. Such systems are capable to combine, within limits given by the buffer capacity, a constant delivery performance with fluctuations in the processing capacity or with delays in adapting the delivery performance to a varying processing capacity. Buffer stretches, however, call for conveyance with varying distances between the articles, which—while able to be implemented in a relatively simple manner for conveyance of loosely lying articles—necessitates elaborate systems for gripped conveyance, i.e. holding elements capable of being conveyed independently of one another.

An example for illustrating the problems and difficulties described in brief above in a simple manner is the stacking and packaging (processing) of printed products, which, for example, are produced in a web-fed printing machine and which between the web-fed printing machine and the stacking/packaging are completed on-line by addition of partial products, of supplements and/or of other products. Stacking and packaging can only be carried out in a regularly clocked manner, if all packages to be produced are of the same size. If, however, for individual destinations predetermined numbers of printed products are to be packed in groups of maximum sized standard packages and smaller peak packages, then the stacking/packaging capacity (in printed products per unit of time) is smaller during production of peak packages than during production of standard packages. Because in this case adaptation of the delivery speed of the web-fed printing press to variations in the stacking/packing capacity does not make any sense, usually an additional device is provided for producing the peak packages and the printed products to be packed in peak packages are supplied to this additional device by being conveyed past the stacking device for standard packages. Because commercially available stacking/packaging devices are usually able to produce both standard packages as well as peak packages without problem and because the peak packages only account for a small proportion of the overall volume, it would be desirable to be able to do without the additional, not very well utilized device for the production of the peak packages. This would be even more desirable, if possible without calling for a buffer stretch before stacking, without increased complexity of the whole installation and in particular without removal of completed printed products before stacking, which removed completed products need to be disassembled for re-introduction into the system.

SUMMARY OF THE INVENTION

In particular in order to fulfill the above desire of the printing sector, the present invention is directed toward a method and a device for sequential supply of articles (e.g., printed products) delivered, for example, on-line (e.g., from a web-fed printing press) to a processing operation (e.g., stacking and packaging). The method and device according to the invention make it possible to, in a most simple manner, absorb temporary reductions of the processing capacity without influencing the supply capacity and without requiring a buffer stretch or an additional processing device. The device according to the invention is to be simple. In particular it is to be able to be implemented using simple conveying means, which can only be operated in a rigid clock cycling regime.

The method and the device according to the invention are to be particularly advantageously useable for the above example of the production of printed products including on-line completion and stacking/packaging in standard and peak packages. However, use of method and device according to the invention shall in no way be restricted to this example.

The method in accordance with the invention is based on the idea of removing articles from a regularly clocked supply stream in order to adapt the supply performance to a temporarily reduced processing capacity. However, whereas according to prior art the removal takes place immediately on transfer of the articles to the processing operation, according to the invention, removal is displaced to a freely selectable point further upstream, advantageously upstream of a further processing device for on-line processing of the articles before transfer to the final processing operation (e.g., on-line completion).

This is achieved by returning articles, which for lack of processing capacity cannot be transferred to be processed, and by re-introducing them into the supply stream in a location upstream of the transfer point. In order to make re-introduction into the fixedly clocked supply stream possible, corresponding gaps are established in this stream in a controlled manner, such that there is a gap at the point of re-introduction (return point) whenever a returned article is to be re-introduced.

The supply track along which the articles are conveyed from a delivery device to the processing device comprises a gap formation point, a return point, and a transfer point at the end of the track from where the articles are transferred to the processing operation or from where, if so required, they are returned to the return point along a return track. The gap formation point is situated at the return point or upstream of the return point. The position of the gap formation point can be selected on the basis of any criteria. The length of the return track in conveying clock cycles is dependent on the geographical distance between the gap formation point and the return point as well as on the time difference (also in clock cycles) between a non-transfer and a corresponding gap formation. In this, a conveying clock cycle is to be understood as a locational unit, namely as the distance between two articles conveyed one behind the other, and as a temporal unit being, during operation, fixedly correlated with the locational unit through the conveying speed.

In a system in which the articles in the supply stream stem from an on-line source, it is advantageous to form the gaps in the supply stream by removing articles from this stream. If, however, the articles for the supply stream are retrieved from a store it is also possible to form the gaps already on establishing the supply stream at the store outlet.

A device for carrying out the method according to the invention being equipped for conveying the articles individually gripped can be implemented with no other conveying devices than ones that can be operated only in a regularly clocked manner (advantageously circulating gripper chains). For conveyance between the return point and the transfer point along the supply track and along the return track, it is advantageous to use one single circulating conveying means on which holding means (e.g., grippers) are arranged at regular distances between one another. The holding means are controlled for gripping one article each, for conveying the article in a held manner, and for releasing the article.

Along the supply track the articles may be subjected to further on-line processing steps both upstream of the return point as well as downstream of it. Advantageously, the gap formation point is positioned upstream of any such processing step and the further processing steps are controlled for being able to deal with gaps and/or returned articles in the supply stream. In this manner, only unprocessed articles are removed from the supply stream for forming the gaps, i.e. articles that can be reintroduced into the system without problems. Furthermore, equipment that may be provided for other reasons can be used for the removal.

Supply of articles according to the invention can be implemented with the same, very simple conveying means as used for known article supply methods in which articles not being able to be transferred to processing for lack of processing capacity are removed from the system. The principle advantage of the method according to the invention, in comparison with such known supply methods, resides in the fact that article removal (gap formation point) can be located at a substantially freely selectable point of the supply track, advantageously at a point, at which easily recyclable (for example, not yet processed) articles are removed, or at a point, at which removal means are provided for other reasons. Despite the fact that removal (gap formation) may take place at a great distance from the processing operation to which the articles are supplied, the system can react to processing capacity reductions essentially without any time delay.

In case of the above mentioned example for an application of the invention, i.e. for stacking and packing of products immediately before on-line completion by addition of further products, the gaps in the supply stream are formed upstream of the completion device. Completion is suspended for gaps. Articles that are not transferred to be stacked and packaged are re-introduced into the supply stream between the completion device and the transfer to stacking/packaging. This means that all completed products are processed by one and the same stacking/packaging device and the products removed from the system are not completed (contain no further products) and can therefore be recycled into the system at a suitable time without further effort.

BRIEF DESCRIPTION OF THE DRAWINGS

Method and device in accordance with the invention and the example of an application already sketched out further above (web-fed printing press, on-line completion and packaging for producing printed products) are described in more detail on the basis of the following figures, wherein.

DETAILED DESCRIPTION OF THE PREFERRED EMBODIMENTS

Figure 1:
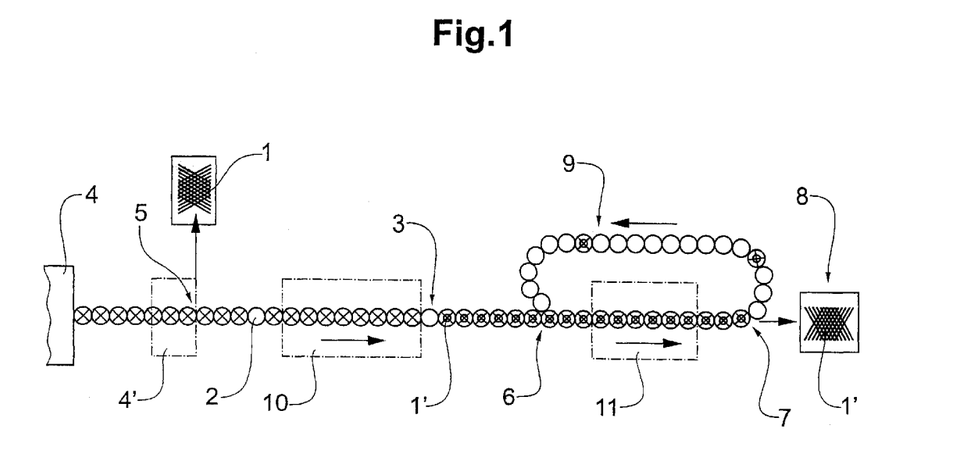
FIGS. 1 and 2 show two simple schematic process diagrams for explaining the method according to the invention.
Figure 2:
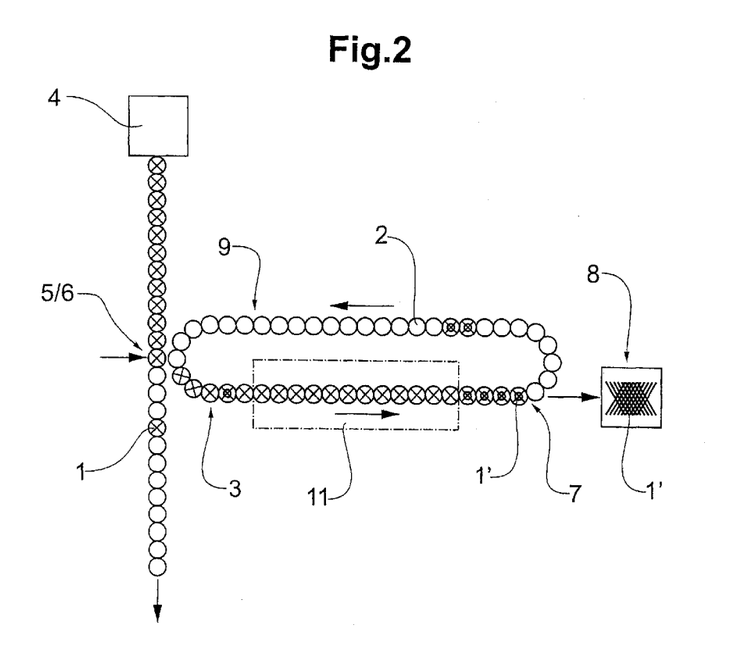

FIGS. 1 and 2 show in a very schematic manner the method for sequential supply of articles 1 (depicted as crosses) to a processing operation according to the invention. For the supply, the articles 1 are conveyed regularly clocked and held gripped along a supply track. Such regularly clocked conveyance is illustrated in FIGS. 1 and 2 as a row of circles, wherein conveyed articles 1 are depicted as circles filled with a cross (on-line processed articles 1' with an additional small circle) and gaps 2 as empty circles. Every circle represents a conveying clock cycle.

The supply track 3 leads from an article delivering device 4, from which articles are fed into the supply stream, past the gap formation point 5, where gaps are formed in the supply stream, to the return point 6, where articles 1 (possibly on-line processed articles 1') not transferred to processing are re-introduced into the supply stream, and from there to the transfer point 7, where possibly on-line processed articles 1' are transferred to the processing operation 8 or are returned. From the transfer point 7, the return track 9, on which not transferred, possibly on-line processed articles 1' are returned, leads back to the return point 6. Upstream of the transfer point 7 or at the transfer point 7 means (not shown) can be provided for removing faulty products from the supply stream.

In the case of a delivering device 4 operating on-line, the gap formation point is located downstream of the delivering device and the gaps 2 are formed by removing articles 1 from the supply stream. In the case of a delivering device 4' operating as a store outlet, it is advantageous to locate the gap forming point 5 immediately at the store outlet, i.e., to correspondingly control retrieval of articles from the store.

For synchronization of gaps 2 arriving at the return point 6 along the supply track 3 and of not transferred and returned articles 1 arriving at the return point 6 along the return track 9 such that they meet in an controlled manner, the length (in conveying clock cycles) of the supply track 3 between the gap formation point 5 and the return point 6, the length (in conveying clock cycles) of the return track 9 and the time difference (in conveying clock cycles) between the non-transfer of an article 1 and the formation of a corresponding gap 2 in the supply stream have to be correspondingly matched. This matching can be adapted to various external conditions in various ways, as is illustrated in FIGS. 1 and 2.

FIG. 1 depicts a system, in which the articles 1 are to be processed on-line (e.g., completed) in a further processing device 10 between the article delivering device 4 or 4' and the return point 6 and in which no (on-line) processed articles are to be removed from the supply stream. For this reason, the gap formation point 5 is arranged upstream of the further processing device 10. The return track 9 and the supply track 3 from the return point 6 to the transfer point 7 are advantageously served by a single, circulating conveying organ, to which, at the return point 6, the articles 1' of the supply stream are transferred from an other conveying organ.

The length of the supply track 3 between the gap formation point 5 and the return point 6 is given mainly by the further processing device 10. If a gap is formed without any delay relative to a non-transfer of an article at the transfer point 7, the return path 9 has the same length as the part of the supply track from the gap formation point 5 to the return point 6. A delay between non-transfer and gap formation calls for a corresponding extension of the return track 9. If the non-transfer is decided on prior to the arrival of the respective article at the transfer point 7, gap formation can be initialized early (negative delay) and the return track 9 can be correspondingly shorter.

The further processing device 10 is to be controlled such that processing steps are suspended for gaps 2 in the feeding-in stream. In addition to a further processing device 10 located between the gap formation point 5 and the return point 6, it is also possible to provide another further processing device 11 between the return point 6 and the transfer point 7. This further processing device 11 has to be controlled such that processing is suspended for returned articles.

FIG. 2 illustrates a system, which comprises a further processing device 11 only between the return point 6 and the transfer point 7. For this reason, the length of the supply track 3 between the gap formation point and the transfer point 7 can be shortened in a freely selectable manner. It can even have a zero length, as illustrated, such that the gap formation point 5 and the return point 6 coincide and an article is removed simultaneously with the arrival of a returned article on the return track 9 at this point 5/6. The same as in the system according to FIG. 1, it is advantageous to realize the supply track 3 between the point 5/6 and the transfer point 7 and the return track 9 with a single, circulating conveying organ. For the supply track 3 upstream of the point 5/6, a further conveying organ is provided, which transfers the supply stream at the point 5/6 and which conveys removed articles onwards.

Figure 3:
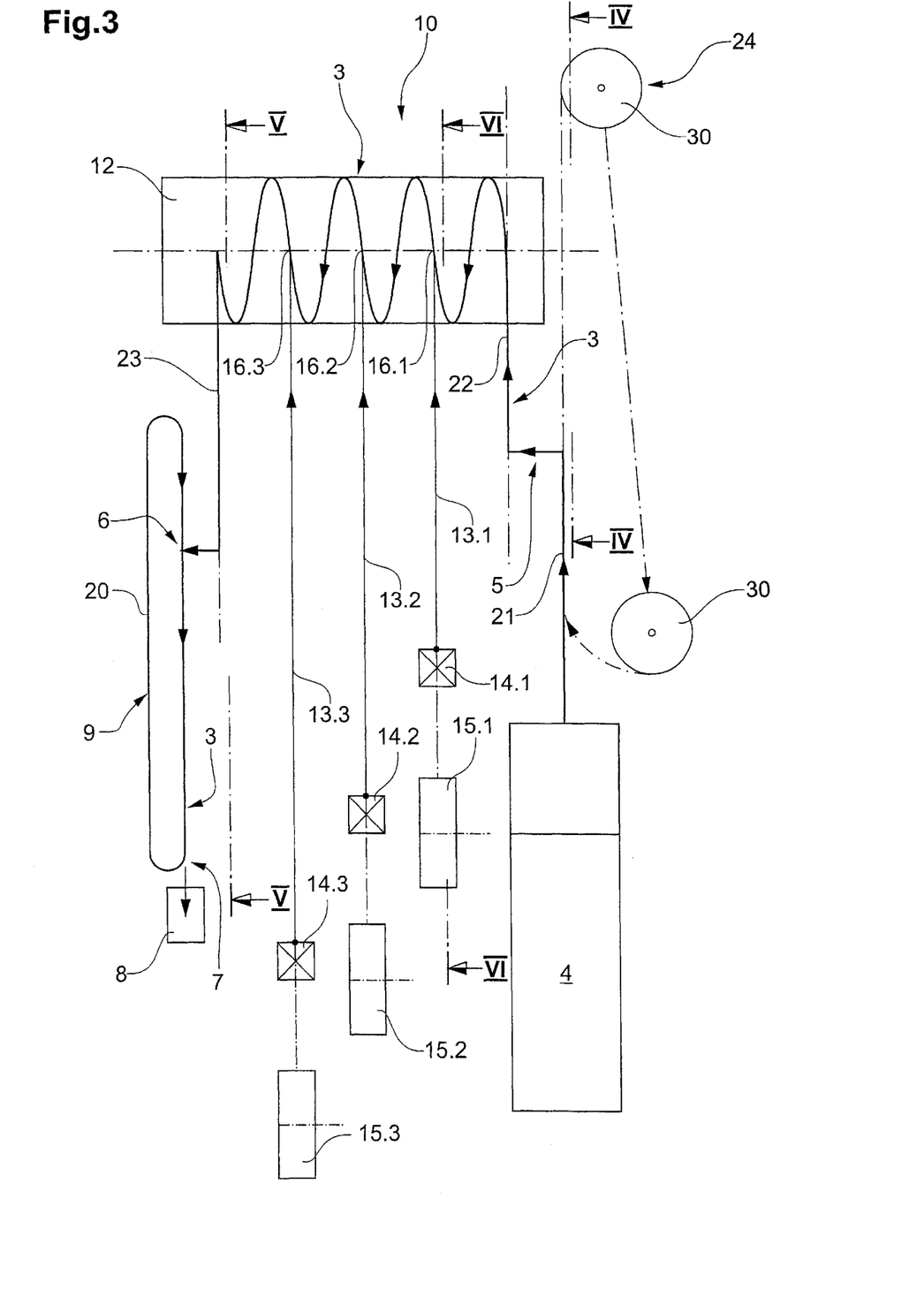
FIG. 3 shows a schematic horizontal projection layout of the named application example.

FIG. 3 is a plan view and illustrates an installation, in which main products of printed products (e.g., newspapers) are delivered on-line by a web-fed printing press (article delivering device 4), on-line completed in a completion device 12 (further processing device 10), e.g. an insertion drum, and from there are supplied to a stacking and packaging operation (article processing device 8). A further on-line processing device between return point 6 and transfer point 7 (11 in FIG. 1) is not provided. Three part supply systems 13.1 to 13.3 are provided for supplying part products (or supplements or other articles, etc.) from sheet feeders 14.1 to 14.3 and/or winding stations 15.1 to 15.3 to the completion device 10. The installation in its essential features corresponds to the schematic diagram of FIG. 1. The same functional units are therefore designated with the same reference numbers as in FIG. 1.

The supply track 3, depicted in FIG. 3 as a bold line leads from the article delivering device 4 to the on-line completion device 12, e.g. in a spiral track through the completion device 12 and past the part supply points 16.1 to 16.3 and from the completion device 12 to the article processing device 8. The gap formation point 5 is situated upstream of the completion device 12, the return point 6 downstream of the completion device 12.

The return track 9 and the one part of the supply track 3 between the return point 6 and the transfer point 7 is implemented with a single, circulating conveyor (last conveyor 20), by which at the transfer point 7, completed products are either transferred to the stacking operation or are not transferred and conveyed onwards, and by which the supply stream is taken over at the return point 6, where returned products are fitted into gaps of the supply stream.

In addition to the completion device 12, three further, clock-cycled conveyors 21, 22 and 23 are provided for the supply track 3 between the article delivering device 4 and the last conveyor 20. The first conveyor 21 serves for conveyance from the delivering device 4 to a device 24 for producing storage units (e.g., rolls) of main products. Such a first conveyor 21 and device 24 are usually provided as standard equipment for the production of part products and supplements being printed and arranged in storage formations off-line for being supplied later into the completion device 12 with the help of the part supply systems 13.1 to 13.3. When producing main products on-line, the supply stream is transferred from the first conveyor 21 to the second conveyor 22 at the gap formation point 5, wherein main products to be removed from the supply stream for forming gaps are conveyed onwards by the first conveyor 21. From these removed main products, storage formations 30 are made for being, for example, supplied to be completed and packed after the end of the web-fed printing press production or during an interruption of it. The second conveyor 22 conveys the main products to the completion device 12. The third conveyor takes over the completed main products from the completion device 12 and conveys them to the last conveyor 20, to which they are transferred at the return point 6.

Figure 4:
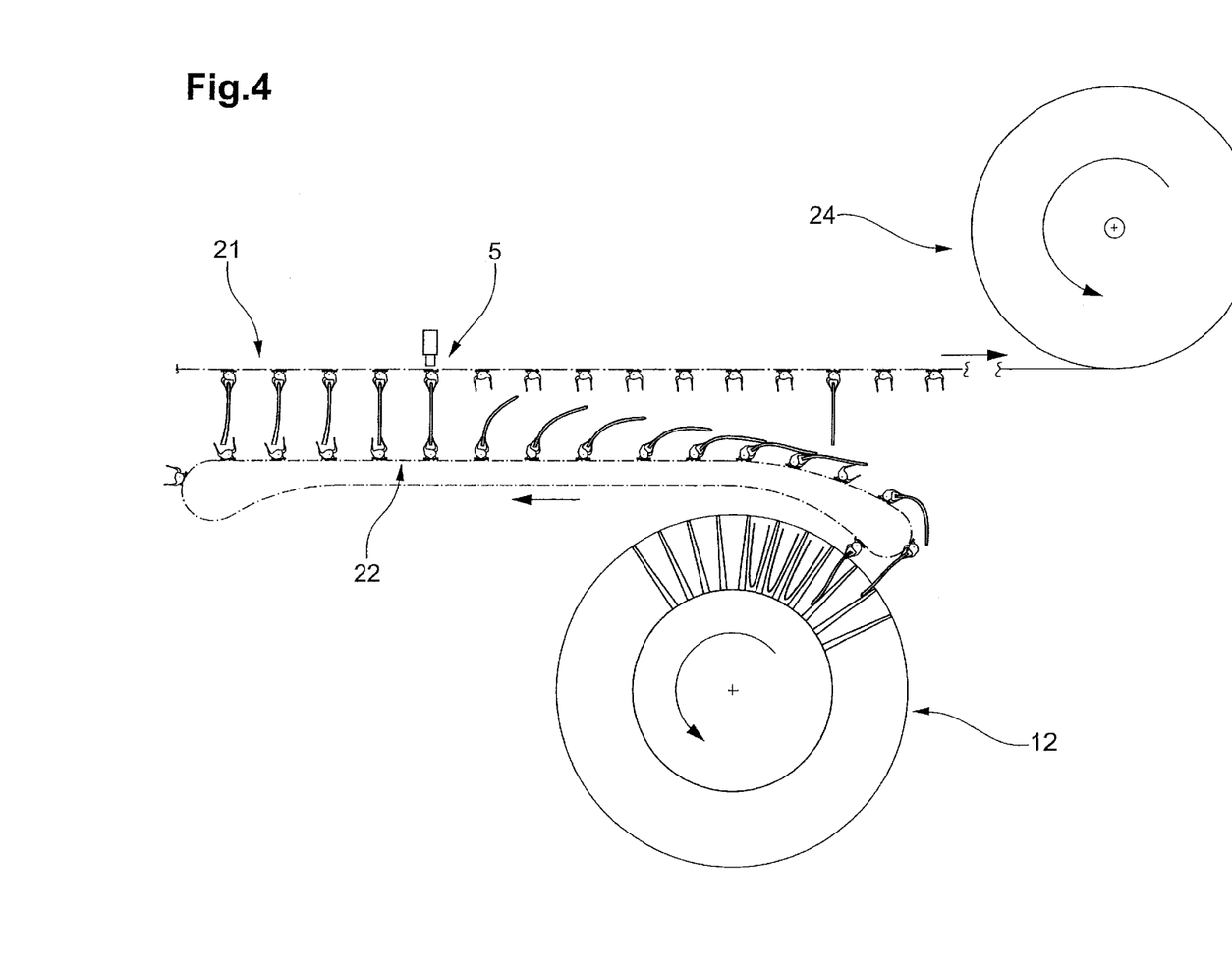
FIGS. 4, 5 and 6 show three cross sections through the schematic diagram of FIG. 3 with somewhat more detail (intersection lines IV—IV, V—V and VI—VI).
Figure 5:
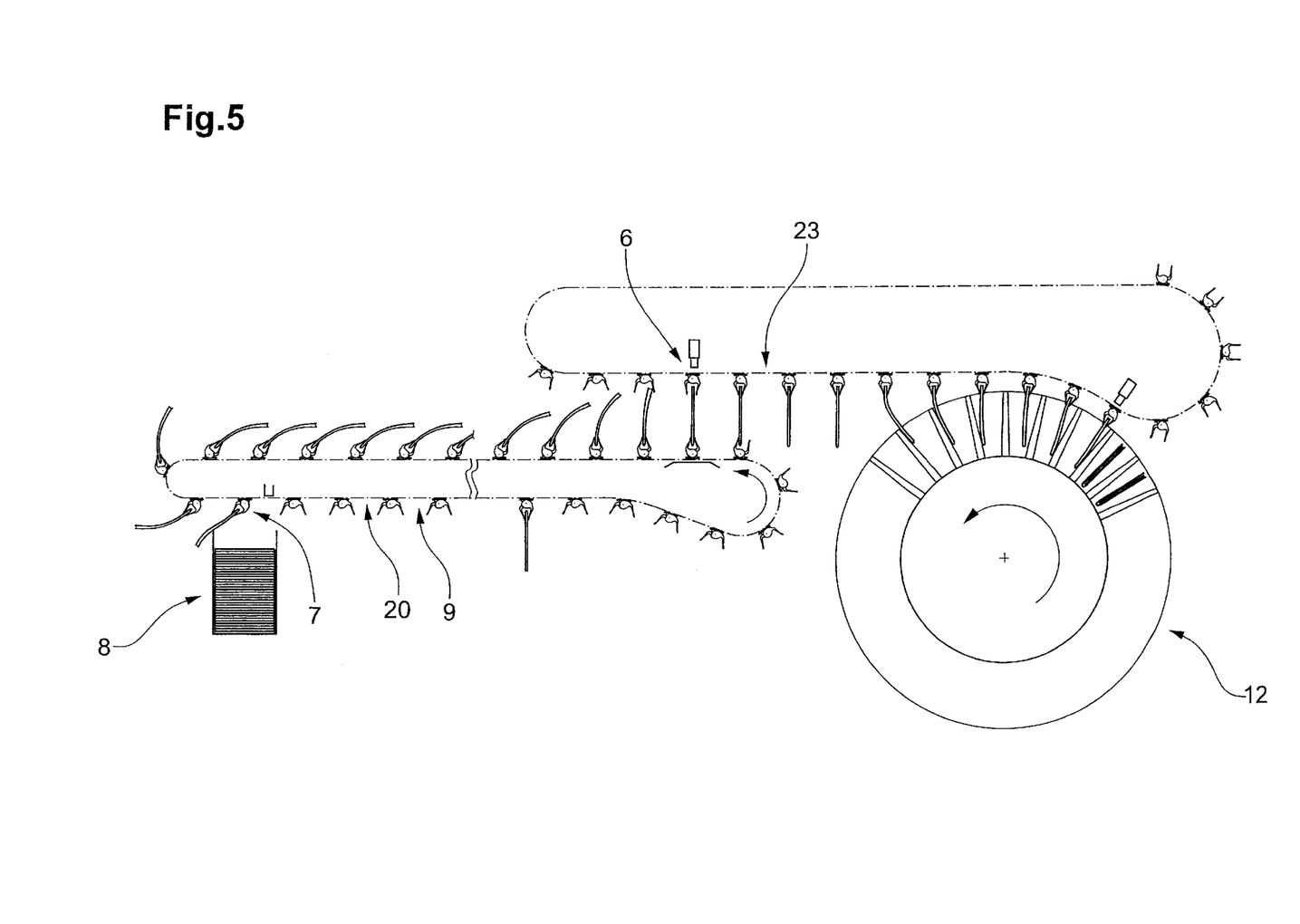
Figure 6:
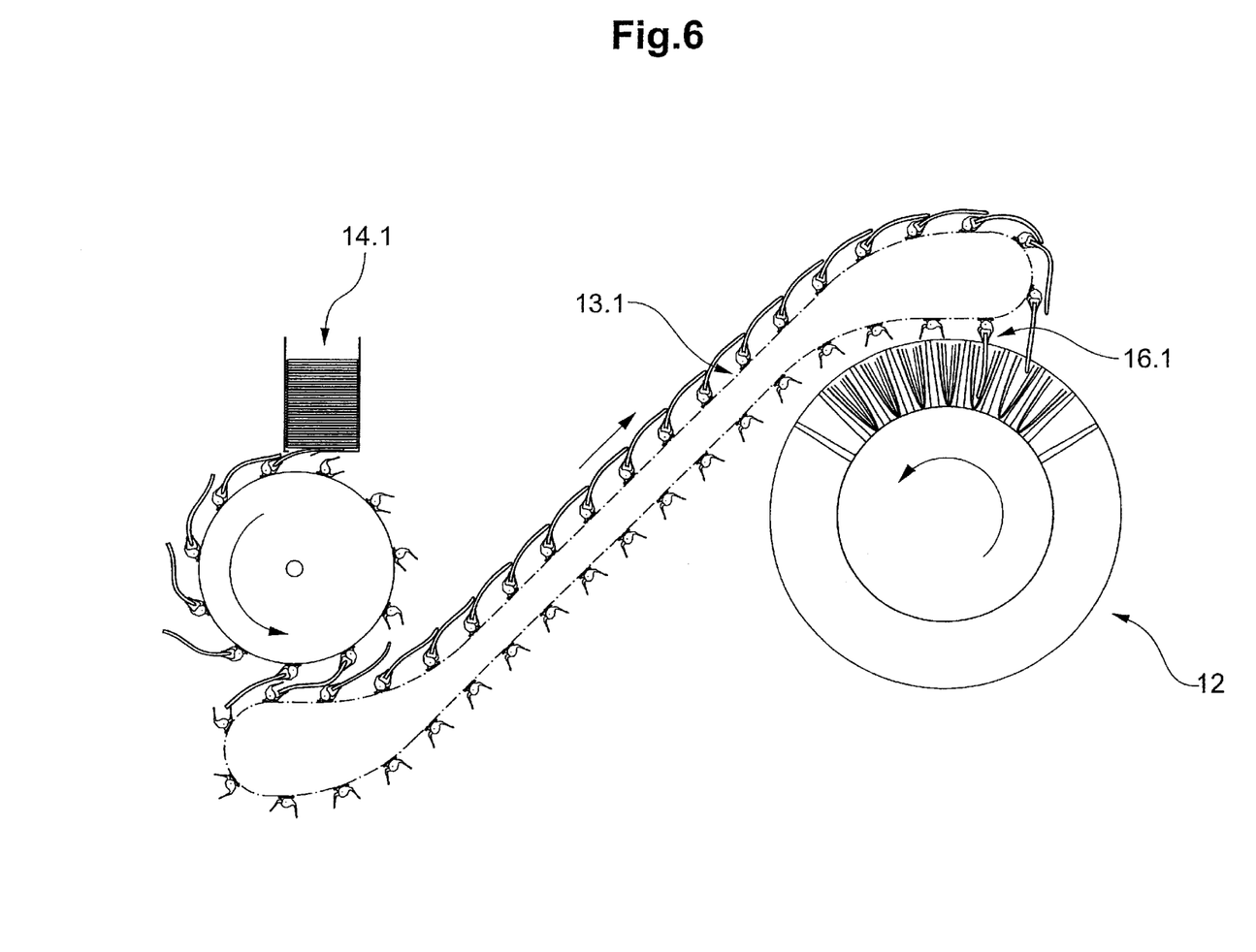

FIGS. 4 to 6 illustrate in somewhat more detail than FIG. 3 cross sections through the installation according to FIG. 3 along the intersection lines designated with IV—IV, V—V and VI—VI in FIG. 3.

FIG. 4 illustrates the first conveyor 21 designed as a gripper chain, the second conveyor 22 also designed as a gripper chain, the completion device 12 designed as a drum and the device 24 for producing storage units (e.g., rolls) from main products removed from the supply stream.

The supply stream is transferred from the first conveyor 21 to the second conveyor 22 at the gap formation point 5, wherein for producing gaps main products are selectively not transferred but conveyed onwards by the first conveyor 21 to the device 24. The second conveyor 22 conveys the supply stream onwards and transfers it to the completion device 12.

FIG. 5 illustrates the third conveyor 23 designed as a gripper chain, which takes over the supply stream (now comprising completed main products) from the completion device 12 and transfers it to the last conveyor 20 at the return point 6. The last conveyor 20 conveys the products from the return point 6 to the transfer point 7 and there transfers them to the processing device 8. If there is no processing capacity, products are not transferred at the transfer point 7, but rather are returned back to the return point 6 by the last conveyor 20 and there they are introduced into gaps of the supply stream.

FIG. 6 illustrates the first one of the part supply systems supplying part products from the sheet feeder 14.1 to the completion device 12. In an as-such known manner, this part supply system is designed as a gripper chain, which takes over the part products from the sheet feeder 14.1 and, at the part supply point 16.1, transfers them to the completion device 12. For making it possible to not supply the part product for a gap in the supply stream of the main products, the distance (in conveying clock cycles) between the point where part products are taken over by the part supply system 13.1 and the part supply point 16.1 is selected such that it corresponds to the distance between the gap formation point (5 in FIG. 3) and the part supply point 16.1 and the gap in the supply stream of the main products is produced simultaneously with the corresponding gap in the part product stream. Therefore, the further downstream that a part supply merges into the main product stream, the longer the part supply track between the sheet feeder 14.1 and the completion device 12 is, as is indicated in FIG. 3.

From FIGS. 3 to 6 it becomes clear that an installation for completing and stacking/packaging main products delivered directly from a web-fed printing press with a main product supply according to the method in accordance with the invention can be implemented using only simple conveying means operated in clocked cycles (e.g., with circulating gripper chains operated at a substantially constant speed), and nonetheless only main products are removed, i.e. products which can be re-introduced into the process in a simple manner, and nonetheless a reduction in stacking/packaging capacity of a single stacking and packaging device on producing peak packages can be absorbed without any problem.

What is claimed is:

1. A method for sequentially supplying articles (1) in a regularly clocked supply stream along a supply track (3) from an article delivering device (4) to an article processing device (8), the method comprising the steps of:
    depending on processing capacity, selectively transferring or not transferring supplied articles (1) to the article processing device (8) at a transfer point (7);
    conveying the not transferred articles (1) away from the transfer point (7) along a return track (9) to a return point (6) upstream of the transfer point (7);
    re-introducing the returned articles into the supply stream at the return point (6) and
    at a gap formation point (5) upstream of the return point (6) or at the return point (6), forming a gap (2) in the supply stream for every article to be re-introduced into the supply stream;
    wherein the articles (1) to be re-introduced and the gaps (2) are synchronized by matching a length in clock cycles of the return track (9) from the transfer point (7) to the return point (6), a length in clock cycles of a Part of the supply track (3) from the gap formation point (5) to the return point (7), and a temporal difference in clock cycles between a non-transfer at the transfer point (8) and a gap formation at the gap formation point (5).

2. The method according to claim 1, wherein the gaps (2) are formed by removing articles (1) from the supply stream.

3. The method according to claim 1, wherein the articles (1) are further processed along the supply track (3) between the gap formation point (5) and the return point (6) and wherein further processing is interrupted for each gap (2).

4. The method according to claim 1, wherein the articles (1) are further processed along the supply track (3) between the return point (6) and the transfer point (7) and wherein further processing is interrupted for returned articles.

5. The method according to claim 3, wherein the articles (2) are main products delivered on-line by the article delivering device (4), wherein between the gap formation point (5) and the transfer point (6) said main products are completed in a completing device (12) by adding to each main product a plurality of part products and wherein in the article processing device (8), the completed main products are stacked and packaged in normal packages and peak packages.

6. The method according to claim 5, wherein the part products are supplied to the completing device (12) in a plurality of part product streams and wherein gaps are produced in these part product streams, the gaps in the part product streams being synchronized with the gaps (2) in the supply stream of the main products.

7. A device for for performing the method according to claim 1, said device comprising:
    conveying means for conveying the articles (1) in a clock cycled manner along the supply track (3) from the article delivering device (4) to the transfer point (7);
    transfer means located at the transfer point (7) for selectively transferring supplied articles (1) to the article processing device (8);
    conveying-away means for conveying away articles (1) not transferred at the transfer point (7), said conveying-away means serving as return means for conveying the not transferred articles (1) along the return track (9) and for re-introducing the returned articles (1) into the supply stream at the return point (6) upstream of the transfer point (7); and,
    gap forming means for forming gaps (2) in the supply stream at the gap formation point (5) upstream of the return point (6) or at the return point (6).

8. The device according to claim 7, wherein a length in clock cycles of the return track (9) from the transfer point (7)

to the return point (6) is the same as a length of the one part of the supply track (3) from the gap formation point (5) to the return point (6).

9. The device according to claim 7, wherein a length in clock cycles of the return track (9) differs from a length in clock cycles of the one part of the supply track (3) between the gap formation point (5) and the return point (6) by a time delay in clock cycles between a non-transfer at the transfer point (7) and formation of the corresponding gap.

10. The device according to claim 7, wherein a further processing device (10, 11) is situated along the supply track (3) between the gap formation point (5) and the return point (6) and/or between the return point (6) and the transfer point (7).

11. The device according to claim 7, wherein for the one part of the supply track (3) from the return point (6) to the transfer point (7) and for the return track (9) a last conveyor (20) with a circulating conveying organ is provided.

12. The device according to claim 7, wherein the gap formation point (5) is designed as a controlled transfer from a first conveyor (21) to a second conveyor (22) such that articles (1) remaining in the supply stream are transferred and articles (1) to be removed from the supply stream are conveyed onwards.

13. The device according to claim 11, wherein the return point (6) is designed as a transfer point from a third conveyor (23) to the last conveyor (20).

14. The device according to claim 11, wherein the first conveyor (21), the second conveyor (22), the third conveyor (24), and the last conveyor (20) are circulating gripper chains on which grippers are arranged at regular distances between one another.

15. The device according to claim 14, wherein the article delivering device (4) is a web-fed printing press and the article processing device (8) is a stacking/packaging device and wherein a completion device (12) is situated between the second conveyor (22) and the third conveyor (23).

16. The device according to claim 15, wherein for supplying part products to the completion device (12), a plurality of part supply systems (13.1 to 13.3) to part supply points (16.1 to 16.3) are provided, the length in clock cycles of which corresponds to the length of the supply track (3) from the gap formation point (5) to the corresponding part supply point (16.1 to 16.3).

* * * * *